March 27, 1934.  W. M. BECK  1,952,305

LOCK NUT

Filed Dec. 29, 1931

Inventor:
William M. Beck,
John Patten Duffie
Attorney

Patented Mar. 27, 1934

1,952,305

UNITED STATES PATENT OFFICE 1,952,305

LOCK NUT

William M. Beck, Elwood, Ind., assignor of one-half to Charles M. Mitchell; and one-fifth to Frank W. Rockafellar Application December 29, 1931, Serial No. 583,724

2 Claims. (Cl. 151—37)

This invention relates to new and useful improvements in lock nuts.

One object of my invention is to provide a lock nut, which, when screwed up into contact with the bearing surface, will not work loose on the bolt by reason of reverse rotation.

A further object of my invention is to provide a lock nut that will eliminate the use of lock washers or cotter pins.

A still further object of my invention is to provide a lock nut that will eliminate frequent checking and tightening, as required by other types of nuts and washers now in use.

Still another object of my invention is to provide simple and economical locking means that may be applied to any type or types of nuts.

With the foregoing and other objects in view that will appear as the invention of my invention is better understood, the same consists in the novel features of construction, combination and arrangement of parts illustrated in the accompanying drawing and more particularly pointed out in the appended claims.

In the accompanying drawing, which is for illustrative purposes only and is therefore not drawn to scale:

Referring to the drawing for a more particular description of my invention, and in which drawing like parts are designated by like references throughout the several views, A designates the bolt, B the bearing surface against which the lock nut is screwed and C my improved lock nut.

Figure 1:
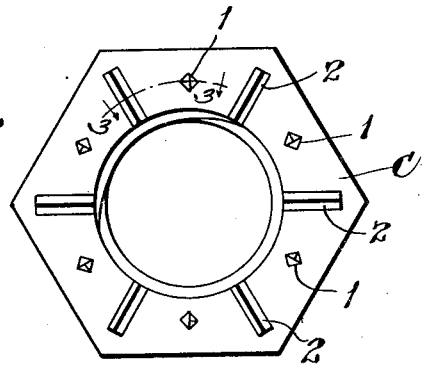
Figure 1 is a face view of the lock nut, equipped with both locking teeth and locking ridges.
Figure 2:
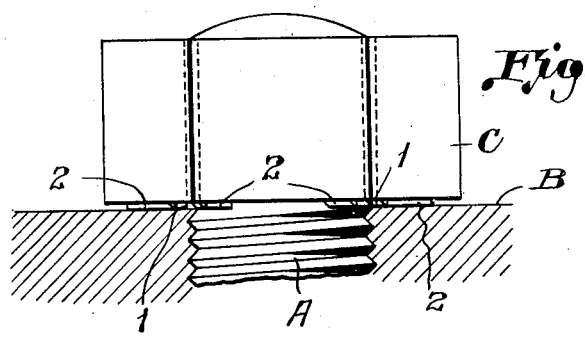
Figure 2 is a side elevation, illustrating the application of the device to a bolt.
Figure 3:
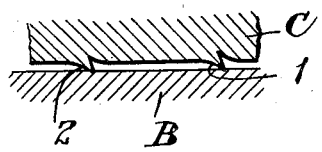
Figure 3 is a section, taken on line 3—3 of Figure 1.
Figure 5:
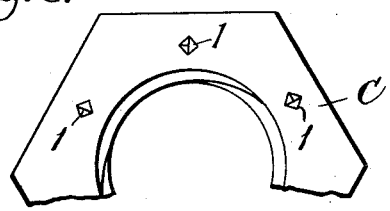
Figure 5 is a fragmentary face view of a lock nut provided with locking teeth only and Figure 6 is a view similar to Figure 5 of a lock nut provided with locking ridges only.
Figure 6:
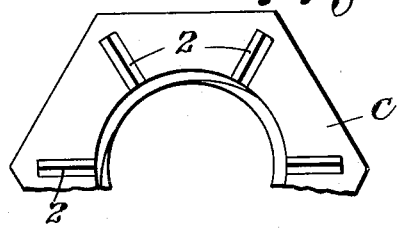
Figure 4:
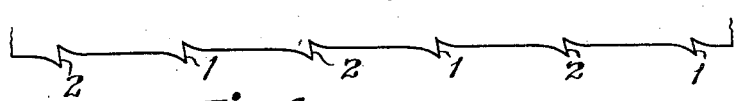
Figure 4 is a diagrammatic view of the construction shown in Figure 1.

In carrying out my invention, one or both faces of the nut C is provided with an alternating series of locking teeth and radially disposed locking ridges 1 and 2, respectively. The aforesaid teeth and ridges are successively graduated in height entirely around the face of the nut, whereby each tooth and ridge will gradually and successively come into contact with the bearing surface B. The teeth and ridges are preferably struck from the face of the nut by a suitable tool (not shown) and are disposed at the desired slant or angle. If desired, the ridges 2 may be eliminated and the locking teeth 1 only employed or vice versa, as shown in Figures 3 and 4, respectively, of the drawing.

My locking means is hardened with cyanide of potassium or other agent and may be applied to any type of nut and to either or both faces thereof.

From the foregoing description taken in connection with the drawing, it is thought that the construction, operation and advantages of my invention will be readily understood, without requiring a more extended explanation.

Various changes in the form, proportions and minor details of construction may be resorted to without departing from the principle or sacrificing any of the advantages of my invention, as defined in the appended claims.

Having described my invention, what I claim as new and desire to secure by Letters Patent, is:

1. A lock nut formed on one face with an alternating series of locking teeth and locking ridges, said teeth and ridges being successively graduated in height entirely around the nut.

2. A rotatable fastener having on the work-engaging face thereof a series of radially disposed locking ridges successively graduated in height.

WILLIAM M. BECK.